United States Patent
Millner et al.

(10) Patent No.: US 9,255,302 B2
(45) Date of Patent: Feb. 9, 2016

(54) METHOD AND DEVICE FOR REDUCING IRON-OXIDE-CONTAINING FEEDSTOCKS IN A HIGH-PRESSURE REDUCING UNIT

(71) Applicant: SIEMENS VAI METALS TECHNOLOGIES GMBH, Linz (AT)

(72) Inventors: Robert Millner, Loosdorf (AT); Gerald Rosenfellner, St.Peter/Au (AT)

(73) Assignee: SIEMENS VAI METALS TECHNOLOGIES GMBH (AT)

( * ) Notice: Subject to any disclaimer, the term of this patent is extended or adjusted under 35 U.S.C. 154(b) by 0 days.

(21) Appl. No.: 14/377,442

(22) PCT Filed: Jan. 11, 2013

(86) PCT No.: PCT/EP2013/050451
§ 371 (c)(1),
(2) Date: Aug. 7, 2014

(87) PCT Pub. No.: WO2013/120639
PCT Pub. Date: Aug. 22, 2013

(65) Prior Publication Data
US 2015/0007697 A1     Jan. 8, 2015

(30) Foreign Application Priority Data
Feb. 14, 2012 (EP) .................................... 12155302

(51) Int. Cl.
*C21B 15/00* (2006.01)
*C21B 13/00* (2006.01)
(Continued)

(52) U.S. Cl.
CPC . *C21B 15/00* (2013.01); *C21B 3/04* (2013.01); *C21B 13/0006* (2013.01);
(Continued)

(58) Field of Classification Search
CPC .......................... C21B 13/073; C21B 2100/04
USPC .............................................. 75/505; 266/156
See application file for complete search history.

(56) References Cited

U.S. PATENT DOCUMENTS

| 4,428,772 A | 1/1984 | Dominguez-Ahedo et al. |
| 4,729,786 A | 3/1988 | Schneider .......................... 75/35 |

(Continued)

FOREIGN PATENT DOCUMENTS

| CN | 85106200 A | 3/1987 |
| CN | 1276018 A | 12/2000 |

(Continued)

OTHER PUBLICATIONS

International Search Report dated Mar. 6, 2013 issued in corresponding International patent application No. PCT/EP2013/050451.

(Continued)

*Primary Examiner* — Roy King
*Assistant Examiner* — Jenny Wu
(74) *Attorney, Agent, or Firm* — Ostrolenk Faber LLP

(57) ABSTRACT

A method for reducing iron-oxide-containing feedstocks by introducing a reducing gas into a high-pressure reducing unit (1) where the reducing gas is consumed by reducing iron-oxide-containing feedstocks and then the reducing gas is withdrawn as top gas from the high-pressure reducing unit (1). At least one subportion of the top gas is admixed to a feed gas as recycle gas (15). The reducing gas is generated by $CO_2$ being separated off from the gas mixture obtained from the addition of the recycle gas (15) to the feed gas after one or more compression steps. The recycle gas (15) is added to the feed gas in at least two recycle gas substreams that are separated from one another with recycle gas substream pressures at various distances from the high-pressure reducing unit (1).

7 Claims, 1 Drawing Sheet

(51) Int. Cl.
*C21B 13/02* (2006.01)
*C21B 3/04* (2006.01)

(52) U.S. Cl.
CPC .......... *C21B 13/0073* (2013.01); *C21B 13/023* (2013.01); *C21B 2100/02* (2013.01); *C21B 2100/04* (2013.01); *Y02W 30/54* (2015.05)

(56) References Cited

U.S. PATENT DOCUMENTS

| | | | |
|---|---|---|---|
| 6,039,916 A | 3/2000 | Celada-Gonzalez | 266/82 |
| 2008/0087135 A1 | 4/2008 | Hwang | 75/10.13 |
| 2010/0162852 A1 | 7/2010 | Becerra-Novoa | 75/433 |
| 2011/0247457 A1 | 10/2011 | Knop | 75/392 |

FOREIGN PATENT DOCUMENTS

| | | |
|---|---|---|
| CN | 101548024 A | 9/2009 |
| CN | 101755056 A | 6/2010 |
| CN | 102232119 A | 11/2011 |
| DE | 32 44 652 A1 | 6/1983 |
| FR | 2 848 123 | 6/2004 |
| FR | 2 848 123 A1 | 6/2004 |

OTHER PUBLICATIONS

Written Opinion dated Mar. 6, 2013 issued in corresponding International patent application No. PCT/EP2013/050451.
Danloy G et al.: "ULCOS—Pilot testing of the low-CO2 blast furnace process at the experimental BF in Luleaa", Revue de Metallurgie—Cahiers D'Informations Techniques, Revue de Metallurgie. Paris, France, vol. 106, No. 1, Jan. 1, 2009, pp. 1-8, XP001521800.
English language translation of Written Opinion of the International Searching Authority dated Mar. 6, 2013 in corresponding International Application No. PCT/EP2013/050451.
International Preliminary Report on Patentability with Written Opinion of the International Searching Authority dated Aug. 28, 2014 in corresponding International Application No. PCT/EP2013/050451 (with English language translation).
Chinese Office Action, dated Mar. 3, 2015, issued in corresponding Chinese Patent Application No. 201380009489.2. English translation . Total 13 pages.

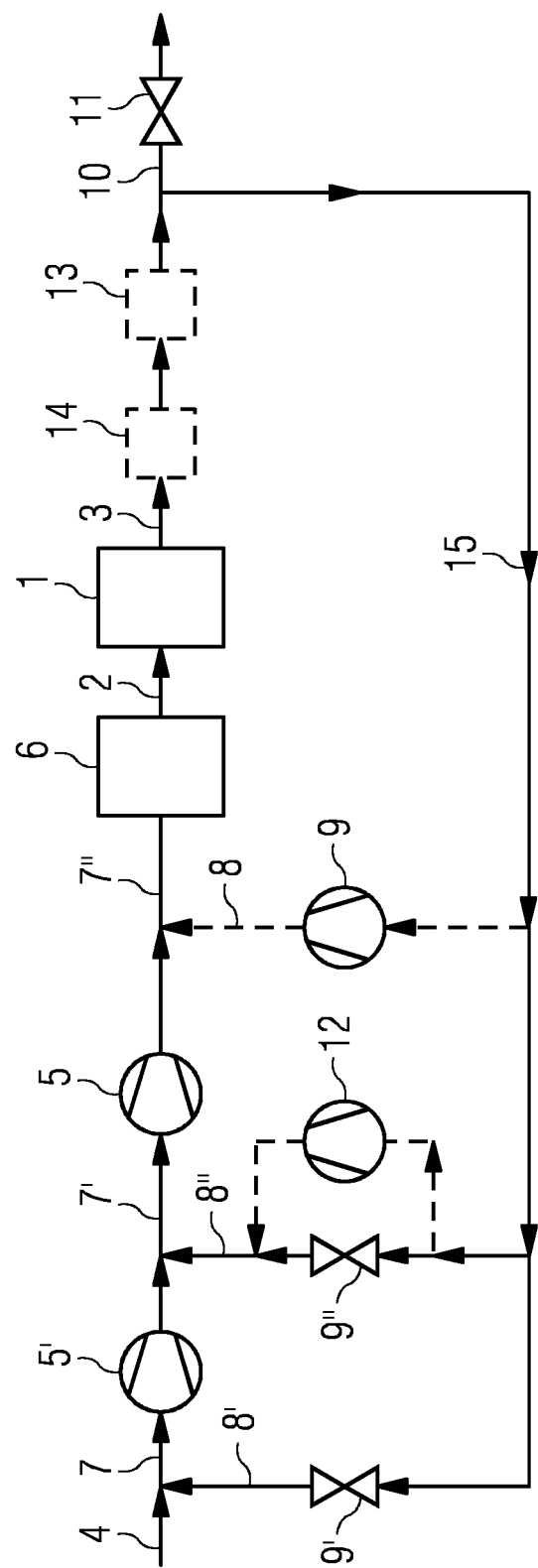

METHOD AND DEVICE FOR REDUCING IRON-OXIDE-CONTAINING FEEDSTOCKS IN A HIGH-PRESSURE REDUCING UNIT

CROSS-REFERENCE TO RELATED APPLICATIONS

The present application is a 35 U.S.C. §§371 national phase conversion of PCT/EP2013/050451, filed Jan. 11, 2013, which claims priority of European Patent Application No. 12155302.8, filed Feb. 14, 2012, the contents of which are incorporated by reference herein. The PCT International Application was published in the German language.

TECHNICAL FIELD

The invention relates to a method for reduction of raw materials containing iron oxide and also to a facility for carrying out the method.

TECHNICAL BACKGROUND

In concrete terms, raw materials containing iron oxide, such as iron ore, materials containing iron ore, partly reduced materials containing iron ore are reduced in the inventive method in a high-pressure reduction unit by introduction of a reduction gas into the high-pressure reduction unit. The reduction gas consumed during the reduction is drawn off from the high-pressure reduction unit as top gas. The reduction gas is created from a feed gas which is exported, for example, as an export gas from a plant for pig iron production and has at least a partial quantity of the withdrawn top gas mixed with it as a recycle gas and from $CO_2$ separated from the gas mixture obtained by the mixing of the recycle gas with the feed gas after one or more compression steps.

Furthermore the invention relates to a facility for carrying out the method described above. The facility comprises a high-pressure reduction unit with a reduction gas line and a top gas line, a feed gas line for supply of feed gas or for supply of a gas mixture of the feed gas and recycle gas respectively into a device for separation of $CO_2$. Compression devices are disposed in the feed gas line. The recycle gas is supplied to the feed gas via a recycle gas part flow line emerging into the feed gas line. A high-pressure reduction unit is to be understood in this case as a reduction unit which is designed for an operating pressure of greater than 2 bar (200 kPa), preferably of greater than 3 bar (300 kPa), even more preferably of greater than 4 bar (400 kPa). The operating pressure corresponds to the pressure of the reduction gas introduced into the reduction unit.

An object of the present invention is the use of the facility for carrying out the described method in a plant network with a plant for production of pig iron and/or crude steel products, especially a FINEX® plant or a COREX® plant.

PRIOR ART

Note: All pressure FIGURES given in the text concern the pressure above the atmospheric pressure.

In the reduction of raw materials containing iron oxide in a reduction unit, a reduction gas is very often created from $CO_2$ contained in a feed gas, which $CO_2$ mostly has a relatively low reduction potential, being at least partly separated off before the gas is conveyed into the reduction unit. This separation is undertaken by known devices for separation of $CO_2$, such as PSA (pressure swing adsorption) facilities, for example. To operate effectively a PSA facility needs a specific minimum pressure level of the feed gas to be handled in it. In order to guarantee this, before the feed gas is introduced into the PSA facility, it is brought to a specific minimum pressure level using large amounts of energy. The reduction gas formed by the $CO_2$ separation exhibits both a relatively high reduction potential and also a relatively high pressure level. In such cases, the pressure level is often too high for it to be supplied directly to a reduction unit. For this reason, this is generally to be found in the structural properties of the reduction unit. Therefore the mechanical energy contained in the reduction gas in the form of pressure energy is reduced before the gas is fed into the reduction unit, for example via valves. The reduction gas consumed during reduction in the reduction unit is drawn off from this unit as top gas and by comparison with the supplied reduction gas has a lower but also still available reduction potential. A part quantity of the top gas drawn off is fed into the feed gas as recycle gas and is mixed with the feed gas before the gas mixture formed here has the $CO_2$ contained in it separated again, for example in a PSA facility.

The reduction potential in such cases represents the capability of a gas to reduce materials containing oxides, while the gas itself is oxidized in this process. The part quantity of the drawn-off top gas is therefore designated as recycle gas, since it is mixed with the feed gas and thus conveyed to the reduction unit at least a second time—after separation of $CO_2$.

The feed gas, which is included as the basis for the creation of the reduction gas, often comes from a plant for production of pig iron, for example from a furnace or a reduction shaft or from a COREX® plant or FINEX® plant. The gas drawn off from such plants or exported from these plants is referred to as export gas. If this export gas is used in another plant, for example in the inventive facility as a basis for the creation of the reduction gas, the export gas is referred to as feed gas. This means that when the export gas is used in another plant, only the designation of the export gas as feed gas changes, but the properties of the export gas remain unchanged.

If such a feed gas is an export gas from one or more melt reduction plants or fluid bed reduction units, based for example on the FINEX® or COREX® method or from a blast furnace and is supplied again to another plant, for example the inventive facility, after being processed into reduction gas, a system encompassing all these said plants and facilities is referred to as a plant network.

The feed gas is cooled and/or cleaned before such preparation in order not to damage or overload the plant needed for processing into reduction gas. In a cooling process or in each cooling process the feed gas has mechanical energy withdrawn from it in the form of pressure energy, whereby the feed gas, before its processing into reduction gas, generally has a comparatively low pressure, for example a pressure of between 0.5 bar and 1.5 bar (50 kPa to 150 kPa).

A first option for processing the feed gas into reduction gas consists of mixing the feed gas after its compression with compressed recycle gas and supplying the gas mixture obtained in this process to the $CO_2$ separator.

For example DE 32 44 652 A1 discloses a method in which the top gas drawn off from the high-pressure reduction unit is conveyed to a $CO_2$ wash, wherein for checking pressure and flow, a compressor and a valve system are used. The recycle gas obtained in the $CO_2$ wash is mixed with feed gas after which it is fed back into the high-pressure reduction unit.

FR 2 848 123 describes a method in which a blast furnace gas is fed back again into the blast furnace by means of two compressed part gas flows separated from one another in each case, wherein one part gas flow is subjected to a $CO_2$ wash before being fed back.

A second option consists of jointly compressing the feed gas and the recycle gas after they have been merged, before the gas mixture thus obtained is supplied to the $CO_2$ separator.

The reduction gas obtained after $CO_2$ separation, for the reasons stated above, often has too high a pressure and is thus, before its introduction into the reduction unit, brought to a lower pressure suitable for the reduction unit. Since the top gas drawn off from the reduction unit likewise has a relatively low pressure—at least always a lower pressure than the reduction gas introduced into the reduction unit, at least that part quantity of the top gas which is to be fed back as recycle gas and is to be processed into reduction gas, is repeatedly brought from a very low pressure level to a high-pressure level necessary for carrying out the $CO_2$ separation.

In both options pressure energy is "destroyed" between the $CO_2$ separation and the reduction unit, which then has to be supplied again thereafter.

These two options also provide only one opportunity in each case for mixing the recycle gas into the feed gas, wherein both opportunities are characterized by mechanical energy in the form of pressure energy being removed from the reduction gas before it is conveyed into the reduction unit and subsequently the feed gas fed into the facility, the recycle gas or the gas mixture consisting of feed gas and recycling gas respectively being supplied with mechanical energy in the form of pressure energy—with an unfavorable energy balance overall.

The pressure level necessary for carrying out the $CO_2$ separation typically lies in a range between 3 bar and 8 bar (300 kPa to 800 kPa). VPSA (Vacuum Pressure Swing Adsorption) facilities are known from the prior art for separation of $CO_2$ from a gas. When such facilities are used, by comparison with PSA facilities, they can be operated at a low pressure level, through which less energy is to be expended for compression of the feed gas or of the recycling gas or the gas mixture formed from these gases. This advantage is more than canceled out by the disadvantages of VPSA facilities, since VPSA facilities, by comparison with PSA facilities, are significantly more expensive to procure and/or more prone to operational faults. The use of VPSA facilities does not change anything in the one possibility of mixing the recycle gas into the feed gas in each case.

The reduction of raw materials containing iron oxide is often carried out at low pressure—for example with a pressure of the reduction gas of 1.5 bar (150 kPa). Because of the low-pressure of the reduction gas, the reduction gas mass per unit of time flowing through the reduction unit, in other words the reduction gas rate, is also small. The smaller the reduction gas rate is, the smaller also the yield rate of the raw materials reduced in the reduction unit is, i.e. the yield quantity of the reduced raw materials per unit of time. To increase the yield rate, the reduction units are therefore enlarged in respect of their capacity for raw materials containing iron oxide.

Variations from the normal operating state can occur in the plant for production of pig iron, which can result in a variation of the export gas amount or of the feed gas amount respectively. The feed gas amount can for example fluctuate around an average value. If the feed gas amount rises above a specific level, it can occur that, for capacity-restricting reasons, a part of the feed gas can no longer be supplied for processing into reduction gas and this part must then bypass the reduction unit via a separate bypass line.

SUMMARY OF THE INVENTION

Technical Object

The underlying object of the invention is thus to provide a method for reduction of raw materials containing iron oxide with an improved energy balance, wherein at the same time, the yield rate of the reduced raw materials is improved, the dimensions of the plant parts are reduced and there can be a better reaction to fluctuations in the operating state of the method.

A further object of the invention is to provide a facility for carrying out the method.

Technical Solution

The object is achieved by a method for reduction of raw materials containing iron oxide, in which a reduction gas is introduced into a high-pressure reduction unit, reduction gas consumed in the high-pressure reduction unit by reduction of raw materials containing iron oxide is drawn off as top gas from the high-pressure reduction unit, and at least one part quantity of the top gas is mixed as a recycle gas into a feed gas. In the method, the reduction gas is created by $CO_2$ being removed after one or more compression steps from the gas mixture obtained by mixing the recycle gas into the feed gas. The recycle gas is mixed into the feed gas or the gas mixture respectively in the at least two separate recycle gas part flows with different recycle gas part flow pressures at different distances from the high-pressure reduction gas unit. After one respective recycle gas part flow has been mixed in, the gas mixture obtained in this case is compressed before a further recycle gas part flow is mixed in, and the sizes of the mixed in recycle gas part flows are regulated so that the recycle gas part flow, of which the recycle gas part flow pressure is the highest, is greater than the other recycle gas part flows in each case.

The high-pressure reduction unit can be embodied for example as a reduction unit with a fluid bed method or packed bed method, as a furnace or as a reduction shaft, wherein the working pressure of the high-pressure reduction unit corresponds to the pressure of the reduction gas and is greater than 2 bar (200 kPa), preferably greater than 3 bar (300 kPa), even more preferably greater than 4 bar (400 kPa). The reduction gas has a high reduction potential. Reduction potential in this case refers to the capability of the gas for reducing materials containing oxide while the gas is oxidized in such cases. In this case this means that it contains a high proportion of CO and/or $H_2$ gas. The reduction gas introduced into the high-pressure reduction unit comes into direct contact in such cases with the raw materials containing iron oxide, especially iron ore and partly reduced raw materials containing iron ore and is consumed during this process. The consumed reduction gas contains a lower proportion of CO and/or $H_2$ gas than the introduced reduction gas, especially the proportion of $CO_2$ gas is higher than in the introduced reduction gas.

The recycle gas part flow pressures are those pressures of the recycle gas part flows at which the respective recycle gas part flows are mixed into the feed gas or the gas mixture consisting of the feed gas and recycle gas respectively. The respective recycle gas part flows are mixed into the feed gas or the gas mixture consisting of the feed gas and recycle gas respectively via recycle gas flow lines. If there are devices present in the recycle gas part flow lines for influencing the size of the respective recycle gas part flow and/or the recycle gas part flow pressure, the respective recycle gas part flow pressures designate the respective recycle gas part flow pressure which, after flowing through the respective device for influencing the size of the respective recycle gas part flow and/or of the respective recycle gas part flow pressure, obtains in the recycle gas part flow line.

A recycle gas part flow can only be mixed into the feed gas or gas mixture consisting of the feed gas and recycle gas if the corresponding recycle gas part flow pressure is greater than the pressure of the feed gas or of the gas mixture at the point of the respective mixing in. Each point of a mixing in corresponds to a different distance from the high-pressure reduction unit. The recycle gas part flows are mixed in so that after mixing in of a first recycle gas part flow to the feed gas, the gas mixture obtained in this case is compressed before the gas mixture has a second recycle gas part flow mixed into it. The first recycle gas part flow is mixed into the feed gas before a first compression step. The sizes of the first and the second recycle gas part flows are regulated so that the recycle gas part flow, of which the recycle gas part flow pressure is the highest, is larger than the respective other recycle gas part flows.

The sizes of the recycle gas part flows are regulated for example by simple regulation valves in the corresponding recycle gas part flow lines. If the pressure of the top gas drawn off, or respectively if the pressure of the recycle gas lies above the pressure of the feed gas, the first recycle gas flow is mixed into the feed gas. By means of the regulation valve fitted into the first recycle gas part flow line the first recycle gas part flow pressure is reduced to such an extent, for example by expansion, that the first recycle gas part flow pressure after the regulation valve lies slightly, for example a few millibars, above the pressure of the feed gas, which provides the opportunity for mixing it into the feed gas. If the pressure of the drawn-off top gas or respectively if the pressure of the recycle gas lies above the pressure of the gas mixture obtained after mixing of the first recycle gas part flow into the feed gas, the gas mixture can also have the second recycle gas part flow mixed into it. In this case the second recycle gas part flow pressure can likewise be reduced by means of the regulation valve fitted into the second recycle gas part flow line to such an extent that the second recycle gas part flow pressure after the regulation valve lies slightly above the pressure of the gas mixture.

It follows from this that the feed gas or the gas mixture consisting of the feed gas and recycle gas can have both the first and also the second recycle gas part flow mixed into it without prior compression. The reduction of the respective recycle gas part flow pressures required before the respective mixing in of the recycle gas part flows is accompanied by an energy loss in the form of a pressure energy loss. This energy loss must be compensated for again in the subsequent sequence by bringing in compression energy in the respective compression steps. In accordance with the type of mixing of the first and/or of the second recycle gas part flow described above the gas mixtures then obtained by mixing in can have further recycle gas flows mixed into them after each compression step.

In accordance with the invention the recycle gas part flows are mixed such that the recycle gas part flow, of which the recycle gas part flow pressure is the highest, is greater than the respective other recycle gas part flows. In this way, the energy losses which are caused by the expansion of the respective recycle gas part flows are minimized. In addition, the compression steps and thus the compression energy to be applied is minimized for the largest recycle gas part flow in each case, since this will already be mixed in with the highest possible recycle gas part flow pressure.

Overall the mechanical energy in the form of pressure energy present in the respective recycle gas part flows is used in the best possible way by this, which results in an optimization of the energy balance of the overall system.

The first recycle gas part flow, i.e. that part quantity of the recycle gas which is mixed into the feed gas by the first recycle gas part flow, is used at the same time to compensate for quantity fluctuations, pressure fluctuations and/or volume fluctuations of the feed gas in order to supply downstream units, especially the compressors, with a constant volume flow. This protects the sensitive compressors and the failsafe capability or the lifetime of the compressor is respectively increased. At the same time an increase in the overall efficiency of the compressors can be achieved with this method.

A further advantage of the invention lies in being able to react to fluctuations of the operating state, especially of the operating state during the reduction of the raw materials containing iron oxide in the high-pressure reduction unit or when starting up and shutting down the high-pressure reduction unit, while simultaneously maintaining a favorable energy balance. If for example an increase in the yield rate of the raw materials reduced in the high-pressure reduction unit, i.e. the yield quantity of the reduced raw materials per unit of time is desired, the pressure of the reduction gas is increased in stages. This results in a raising of the pressure of the top gas drawn off and a raising of the pressure of the recycle gas, wherein at the same time the sizes of the respective recycle gas flows are adjusted so that once again an optimum energy balance is achieved.

The option exists of mixing a compressed recycle gas part flow into the gas mixture present after the last compression step performed. In this case the pressure of the compressed recycle gas flow is increased, by a compressor for example to the extent that after compression it is slightly above the pressure of the gas mixture after the last compression step performed. The mixing in of the largest recycle gas part flow via the compressed recycle gas part flow is only performed if this leads to an optimization of the energy balance overall. This means if, on mixing in the entire recycle gas via the uncompressed recycle gas part flows, the sum of energy losses by expansion and energy outlay through compression were to be higher than the energy outlay by compression of the recycle gas part flow supplied after the last compression step. The mixing in of the largest recycle gas part flow is then especially performed via the compressed recycle gas part flow if the pressure of the drawn-off top gas or the pressure of the recycle gas is lower than the pressure of the feed gas, for example when the high-pressure reduction unit is started up again after a shutdown.

A further preferred embodiment is produced by the pressure of the reduction gas and/or the pressure of the drawn-off top gas being set by means of a device disposed in a DR export gas line for pressure regulation.

By means of the DR export gas line (Direct Reduction export gas line) any amount of drawn-off top gas is taken away as DR export gas (Direct Reduction export gas), which is not to be mixed into the feed gas or the gas mixture(s) of the feed gas and recycle gas again. If the pressure of the DR export gas—and thus also the pressure of the drawn-off top gas are matched, then at the same time the pressure present between the compression steps of the gas mixture of the feed gas and recycle gas is adjusted. This enables the pressure of the drawn-off top gas to be adapted in large ranges, without mechanical energy, for example expansion energy, in the form of pressure energy being lost. A matching of the pressure of the DR export gas can be necessary for example when a specific pressure level for the use of the DR export gas in subordinate units is necessary.

A preferred form of the invention comprises the recycle gas being mixed into the feed gas or the gas mixture respectively in three recycle gas part flows separate from one another.

If three recycle gas part flows are mixed into the feed gas or the gas mixture consisting of the feed gas and recycle gas, the ratio of plant outlay and flexibility of the method in respect of optimization of the energy balance is equalized.

In accordance with a further embodiment the top gas withdrawn from the reduction unit is cleaned and/or subjected to a heat exchange. This protects subsequent parts of the plant, especially pressure regulation valves and/or compressors from too great a dust load of solid particles present in the recycle gas part flows. In addition the perceptible heat of the drawn-off top gas can be used, which contributes to a further improvement in the energy balance.

A further advantageous embodiment of the method is produced when the feed gas comprises export gas from a plant for pig iron production, especially furnace gas, converter gas, synthetic gas from a coal gasifier, coal gas, coke oven gas, top gas from a furnace or a reduction shaft or offgas from a fluid bed reduction unit. Thus gases, which under normal circumstances are supplied for combustion—if necessary after processing—can be included for reduction of raw materials containing iron oxide.

According to a further embodiment the amount of pressure of the drawn-off top gas and thus also the pressure of the recycle gas and/or the recycle gas part flow pressures amount to between 1 bar (100 kPa) and 20 bar (2 MPa), preferably to between 2 bar (200 kPa) and 10 bar (1 MPa), even more preferably to between 3 bar (300 kPa) and 7 bar (700 kPa). This enables a very high yield rate of the raw materials reduced in the high-pressure reduction unit, i.e. the yield quantity of the reduced raw materials per unit of time, to be achieved while simultaneously minimizing the plant dimensions, such as for example the pipe diameters or the high-pressure reduction unit.

A further object of the invention is a facility for performing the method comprising a high-pressure reduction unit with a reduction gas line for supply of reduction gas into the high-pressure reduction unit and with a top gas line for drawing off top gas from the high-pressure reduction unit, a feed gas line with compression devices disposed therein for feeding feed gas or respectively for feeding a gas mixture consisting of the feed gas and recycle gas, which emerges into a device for the separation of $CO_2$, and at least two recycle gas part flow lines emerging into different longitudinal sections of the feed gas line for supply of the drawn-off top gas into the feed gas line are present, wherein a first recycle gas part flow line emerges into the feed gas line before a first compression device and a second recycle gas part flow line emerges into the feed gas line after the first compression device and devices are present disposed in the recycle gas part flow lines for influencing the size of the respective recycle gas part flow and/or the recycle gas part flow pressure and the longitudinal sections are separated from one another by the compression devices disposed in the feed gas line.

The devices for influencing the size of the respective recycle gas part flow and/or of the recycle gas part flow pressure can especially be regulation valves. It is also possible for one or more devices for influencing the size of the respective recycle gas part flow and/or the recycle gas part flow pressure to be devices for compressing the respective recycle gas part flow, especially compressors.

If the high-pressure reduction unit is shut down, for example because of repair work or maintenance work or if parts of the overall unit fail partly or completely, such as the compression devices disposed in the feed gas line, then there is the possibility of routing the supplied feed gas without great effort directly via the first recycle gas part flow line past the high-pressure reduction unit. This is possible without any great effort because in this method of bypassing the high-pressure reduction unit the feed gas does not have to flow through any compression devices, especially in a direction opposite to the normal operating state of compression devices. The bypassed feed gas only has to flow through the device for influencing the size of the first recycle gas part flow and/or the first recycle gas part flow pressure. Since this device generally involves simple pressure regulation valves, this can be realized without any great effort. A separate bypass line to take the feed gas past the high-pressure reduction unit is therefore superfluous.

A further embodiment of the facility comprises a DR export gas line to take DR export gas away from the facility with a device disposed therein for pressure regulation of the reduction gas and/or of the drawn-off top gas is present.

In a preferred embodiment, in at least one of the recycle gas part flow lines of the device for influencing the size of the respective recycle gas part flow and/or the recycle gas part flow pressure, a device for compressing the respective recycle gas part flow is connected in parallel in flow technology terms.

This plant configuration makes possible a highest possible degree of flexibility of the regulation of the respective recycle gas part flows as a function of the respective recycle gas part flow pressure. In particular it can be guaranteed by this configuration that there are constant pressure conditions and constant volume flow conditions in all available devices for compression.

A further preferred embodiment is produced by three recycle gas part flow lines emerging into different longitudinal sections of the feed gas lines being present for supply of the drawn-off top gas into the feed gas line. With this embodiment, with an acceptable level of effort in plant terms, a high degree of flexibility of the regulation of the respective recycle gas part flows is guaranteed as a function of the respective recycle gas part flow pressure.

A further embodiment comprises a device for cleaning the top gas and/or a device for exchange of heat being disposed in the top gas line.

The device for cleaning the top gas can be embodied as a dust removal device, especially as a dry dust removal device or as a wet dust removal device. This prevents both moving parts of the plant, for example rotating parts of compressors and also static parts, such as the inner walls of the recycle gas part flow lines or the inner walls of the reduction gas lines being damaged by solid particles present in the respective gas flows. The devices exchanging heat in the top gas line enable the perceptible heat of the top gas to be made usable for example in other processes.

Another preferred embodiment of the facility comprises the device for separation of $CO_2$ being a PSA facility or a VPSA facility or is a device for separation of gas mixtures by means of membrane technology and/or chemical reaction. In this case the embodiment of the device for separation of $CO_2$ as a PSA facility has the advantage over the embodiment as a VPSA facility because a PSA facility is a lower-cost device and also operates effectively at higher pressures.

A further object of the invention relates to the use of the facility in a plant network with a plant for production of pig iron and/or crude steel products, especially a FINEX® plant or a COREX® plant. Process gas from such plants will often be supplied for combustion and thereby removed from the original material circulation. If the process gases from such plants, for example after preparation, are supplied as the gas to the facility for reduction of raw materials containing iron oxide, then the reduction potential still present in these process gases can be subjected to optimum utilization.

BRIEF DESCRIPTION OF THE DRAWINGS

The invention is explained below by using examples which refer to the enclosed FIGURE. The FIGURE shows an exemplary and schematic diagram of the inventive method and the structure of the inventive facility for reduction of raw materials containing iron oxide.

DESCRIPTION OF THE EMBODIMENT

The FIGURE outlines by way of example and as a schematic a method and a facility for reduction of raw materials containing iron oxide, which comprises the inventive method and the inventive facility.

The arrows included in the FIGURE identify the respective actual and/or possible directions of flow of the gas flows occurring in the inventive facility in a normal operating state of the facility or of the method.

In the inventive method a reduction gas is created by a feed gas, which is supplied to the facility via a feed gas line (4) being supplied with a first recycle gas part flow via a first recycle gas part flow line (8') in a longitudinal section (7) of the feed gas line (4). The gas mixture obtained here consisting of the feed gas and a first recycle gas part flow is compressed in a first compression device (5') before the gas mixture is mixed in via a second recycle gas part flow line (8") into a second recycle gas part flow in a longitudinal section (7') of the feed gas line (4). After mixing in of the second recycle gas part flow, the gas mixture consisting of feed gas, first recycle gas part flow and second recycle gas part flow is compressed in a compression device (5), before the gas mixture thus obtained is mixed where necessary into a compressed recycle gas part flow via the recycle gas part flow (8) in a longitudinal section (7") of the feed gas line (4).

After mixing of the compressed recycle gas part flow into the gas mixture, the gas mixture which contains a proportion of gas capable of reduction which is too small for reduction of raw materials containing iron oxide, such as CO and/or $H_2$, is supplied to a device (6) for separation of $CO_2$. The device (6) for separation of $CO_2$ can, for example, be a PSA facility, or a VPSA facility or a device for separation of gas mixtures by means of membrane technology and/or chemical reaction.

The gas drawn off from the device (6) for separation of $CO_2$ is supplied to a high-pressure reduction unit (1) by a reduction gas line (2). The reduction gas supplied to the high-pressure reduction unit (1) reduces the raw materials containing iron oxide located in the high-pressure reduction unit (1) and in doing so is consumed. The consumed reduction gas is drawn off as top gas from the high-pressure reduction unit (1) via the top gas line (3). If necessary the drawn-off top gas is supplied to a device (14) for exchange of heat and/or to a device (13) for cleaning the top gas. A part quantity of the top gas is introduced as recycle gas (15) via the first recycle gas part flow line (8'), the second recycle gas part flow line (8") and if necessary via the recycle gas part flow line (8) into the feed gas line (4).

Top gas not fed back as recycle gas (15) is removed from the facility via a DR export gas line (10). A device (11) disposed in the DR export gas line (10) for pressure regulation of the reduction gas and/or of the drawn-off top gas makes it possible to explicitly adjust the pressure of the drawn-off top gas and/or of the reduction gas. By means of a device (9) disposed in the first recycle gas part flow line (8') for influencing the level of the first recycle gas part flow and/or of the first recycle gas part flow pressure, especially a regulation valve, the size of the first recycle gas part flow introduced into the feed gas line (4) is regulated. The size of the second recycle gas part flow and/or of the second recycle gas part flow pressure is adjusted or regulated via the device (9") disposed in the second recycle gas part flow line (8") for influencing the size of the second recycle gas part flow and/or of the second recycle gas part flow pressure.

A typical operating state of the method comprises the pressure of the drawn-off top gas core of the recycle gas (15) respectively, which at the same time corresponds to the recycle gas part flow pressures before the gas flows through the devices (9,9',9") for influencing the size of the respective recycle gas part flow and/or of the recycle gas part flow pressure, amounts to 3.3 bar (330 kPa); the pressure of the feed gas in the longitudinal section (7) of the feed gas line amounts to 1.5 bar (150 kPa); the pressure of the gas mixture consisting of feed gas and a first recycle gas after the first compression step in the longitudinal section (7') of the feed gas line (4) amounts to 3 bar (300 kPa) and the pressure of the gas mixture consisting of feed gas, first and second recycle gas part flow after the second compression step in the longitudinal section (7") of the feed gas line (4) amounts to 10 bar (1 MPa).

For example with a total volume of the recycle gas (15) of 220,000 standard cubic meters per hour, the size of the first recycle gas part flow in the first recycle gas flow line (8') amounts to 0 to 20,000 standard cubic meters per hour and the size of the second recycle gas part flow in the second recycle gas part flow line (8") amounts to 200,000 to 220,000 standard cubic meters per hour. The pressure of the recycle gas (15) in this case lies 0.3 bar (30 kPa) above the pressure of the gas mixture in section (7') of the feed gas line (4) and is therefore sufficiently high to bring the recycle gas (15) without prior compression via the second recycle gas part flow line (8") into the longitudinal section (7') of the feed gas line (4). The first recycle gas part flow brought into the longitudinal section (7) primarily serves to compensate for volume fluctuations and/or pressure fluctuations of the feed gas.

This state is more favorable in energy terms than bringing the larger proportion of the recycle gas (15) by the first recycle gas part flow into the feed gas and subsequently compressing the gas mixture obtained thereby in the first compression device (5'). This is shown by a simple exposition of an energy balance:

Before the gas mixture is fed into the device for separation of $CO_2$, the pressure of the gas mixture is raised for example to 10 bar (1 MPa). When the inventive method is used, the main quantity of the recycle gas (15) is brought into the feed gas line (4) via the second recycle gas part flow. For this purpose the second recycle gas part flow pressure is reduced by means of the device (9") for influencing the size of the second recycle gas part flow and/or of the recycle gas part flow pressure from 3.3 bar (330 kPa) to 3 bar (300 kPa), or slightly over 3 bar (300 kPa) respectively. This corresponds to the pressure or lies slightly above the pressure respectively of the gas mixture in the longitudinal section (7') of the feed gas line (4). In this case 0.3 bar (30 kPa) of pressure energy is "destroyed", for example by expansion of the second recycle gas part flow in the device (9") for influencing the size of the second recycle gas part flow and/or of the recycle gas part flow pressure. Pressure energy refers to the energy per volume unit of gas.

The gas mixture in the longitudinal section (7') of the feed gas line (4) is subsequently supplied in the compression device (5) with pressure energy amounting to 7 bar (700 kPa). The sum of the "destroyed" pressure energy and supplied pressure energy amounts to 7.3 bar (730 kPa). Were the main quantity of the recycle gas (15) to be introduced exclusively via the first recycle gas part flow into the feed gas line (4), 1.8 bar (180 kPa) of pressure energy would have to be "destroyed" in the device (9') for influencing the size of the first recycle gas part flow and/or of the recycle gas part flow pressure and subsequently pressure energy amounting to 1.5 bar (150 kPa) would have to be supplied in the first compression device (5') and pressure energy amounting to 7 bar (700 kPa) would have to be supplied in compression device (5). The sum of "destroyed" pressure energy and supplied pressure energy would amount to 10.3 bar (1.03 MPa), which is significantly higher than it is with the inventive method. If necessary a compressed recycle gas part flow is introduced in addition via the recycle gas part flow line (8) into a longitudinal section (7") of the feed gas line (4). It is thus possible for the recycle gas for example to be able to be introduced into the feed gas line (4) even when the pressure of the drawn-off top gas or of the recycle gas respectively is less than the pressure of the feed gas. In particular this operating state occurs during startup after a shutdown of the high-pressure reduction unit (1).

Optionally the device (9") for influencing the size of the second recycle gas part flow is connected in parallel in flow technology terms with a device (12) for compressing the recycle gas part flow.

The feed gas which is supplied to the facility via the feed gas line (4) can be exported from a plant for pig iron production, especially furnace gas, converter gas, synthetic gas from a coal gasifier, coal gas, coke oven gas, top gas from a furnace or a reduction shaft or off gas from a fluid bed reduction unit. Preferably the feed gas comprises export gas from a FINEX® plant or a COREX® plant.

Although the invention has been illustrated more closely and described in detail by the preferred exemplary embodiment, the invention is not restricted by the disclosed examples and other variations can be derived therefrom by the person skilled in the art, without departing from the scope of protection of the invention.

LIST OF REFERENCE CHARACTERS

1 High-pressure reduction unit
2 Reduction gas line
3 Top gas line
4 Feed gas line
5 Compression device
5' First compression device
6 Device for separation of $CO_2$
7, 7', 7" Longitudinal section of the feed gas line
8 Recycle gas part flow line
8' First recycle gas part flow line
8" Second recycle gas part flow line
9, 9', 9" Devices for influencing the size of the respective recycle gas part flow and/or of the recycle gas part flow pressure
10 DR export gas line
11 Device for regulating the pressure of the reduction gas and/or of the drawn-off top gas
12 Device for compressing the recycle gas part flow
13 Device for cleaning the top gas
14 Device for heat exchange
15 Recycle gas

The invention claimed is:

1. A method for reduction of raw materials containing iron oxide, comprising:
   introducing a reduction gas into a pressure reduction unit;
   consuming the reduction gas by reduction of raw materials containing iron oxide in the pressure reduction unit and drawing off top gas;
   forming a gas mixture with a feed gas and at least a part quantity of top gas as a recycle gas;
   creating the reduction gas by mixing the recycle gas with the feed gas after one or more compression steps to form the gas mixture and separating $CO_2$ from the gas mixture;
   wherein forming the gas mixture occurs in at least two recycle gas part flows separate from one another at different distances from the pressure reduction unit by compressing the gas mixture and then mixing in a further recycle gas part flow; and
   regulating a quantity of the gas mixture such that a pressure of one of a recycle gas part flow is greater than a pressure of other respective recycle gas part flows.

2. The method as claimed in claim 1, further comprising:
   adjusting the pressure of the reduction gas and/or the pressure of the drawn-off top gas in a device for pressure regulation disposed in a DR export gas line.

3. The method as claimed in claim 1, wherein the number of the at least two recycle gas part flows is three.

4. The method as claimed in claim 1, further comprising cleaning and/or subjecting the to gas drawn off from the reduction unit to a heat exchange.

5. The method as claimed in claim 1, wherein the feed gas comprises export gas from a plant for pig iron production.

6. The method as claimed in claim 1, wherein the pressure of the drawn-off top gas is between 1 bar and 20 bar.

7. The method of claim 5, wherein the gas from a plant is one or more selected from the group consisting of furnace gas, converter gas, synthetic gas from a coal gasifier, coal gas, coke oven gas, top gas from a furnace or a reduction shaft or off gas from a fluid bed reduction unit.

* * * * *